United States Patent
Hobbins

[15] 3,704,982
[45] Dec. 5, 1972

[54] STICK SHIFTER CONTROL FOR AUTOMATIC TRANSMISSION

[72] Inventor: James F. Hobbins, Philadelphia, Pa.

[73] Assignee: Hurst Performance, Inc., Warminster, Pa.

[22] Filed: Feb. 12, 1971

[21] Appl. No.: 114,837

[52] U.S. Cl. .............................................. 74/473 R
[51] Int. Cl. .............................................. G05g 7/00
[58] Field of Search ............ 74/473 R, 475, 476, 477

[56] References Cited

UNITED STATES PATENTS

| 2,684,600 | 7/1954 | Naumann | 74/477 |
| 3,520,208 | 7/1970 | Davis et al | 74/477 |

FOREIGN PATENTS OR APPLICATIONS

| 598,932 | 6/1934 | Germany | 74/477 |

Primary Examiner—Milton Kaufman
Attorney—James F. Coffee, James M. Wetzel, James R. Sweeney, J. Robert Stapleton, William R. McNair and John R. Hoffman

[57] ABSTRACT

A stick control for use with an automatic transmission is disclosed in which a stick-operated shift lever is provided for manual selection of the various control valve positions of the automatic transmission. The stick bottom projects through a fixed gate opening, which gate cooperates with a spring-held cam, said gate and cam providing a series of fixed stops, guides, sloped surfaces, barriers and a locking pocket. One of said slopes provides a deflectable barrier which divides the gate so that forward gears are arranged on one side for positive and accurate upshifting and downshifting, and the gear positions used in automatic driving are located on a second side. A lock arrangement is provided for the park position.

7 Claims, 22 Drawing Figures

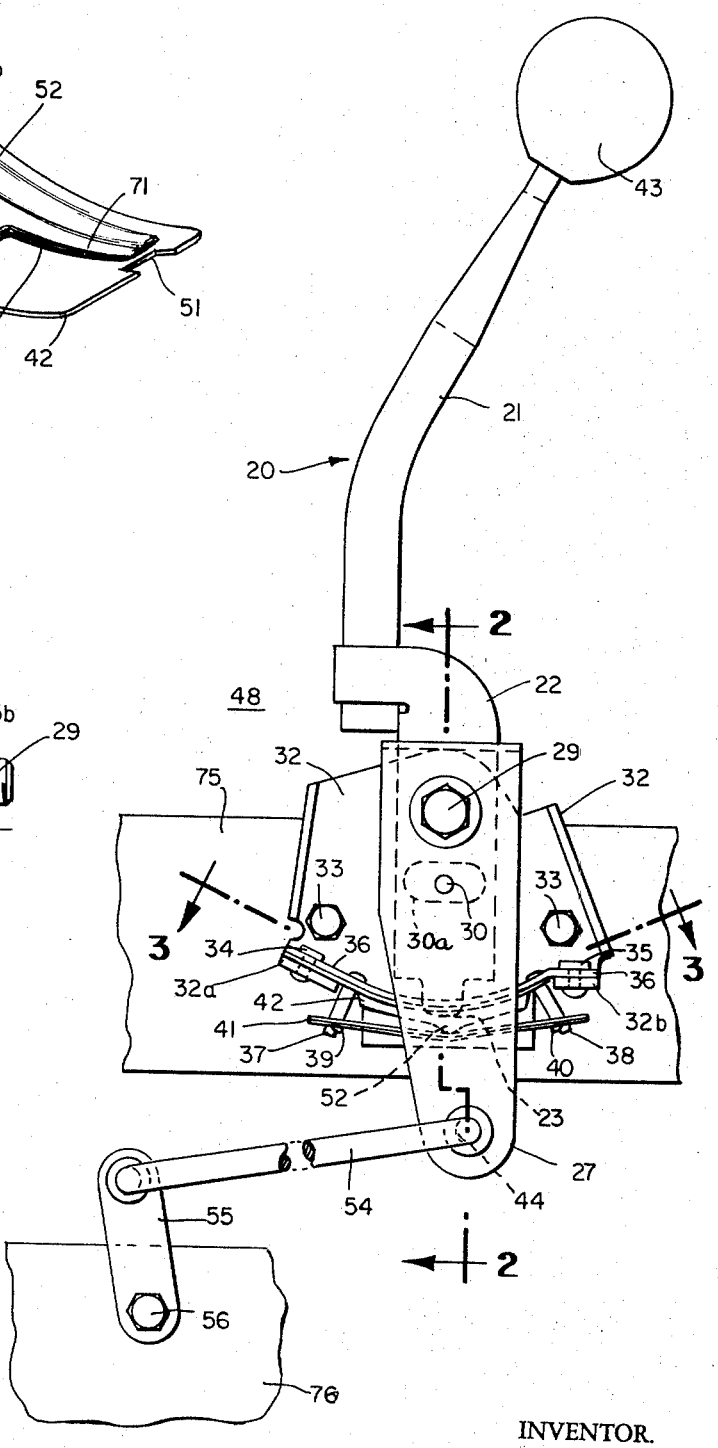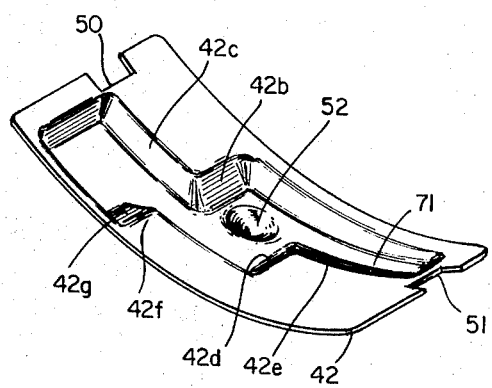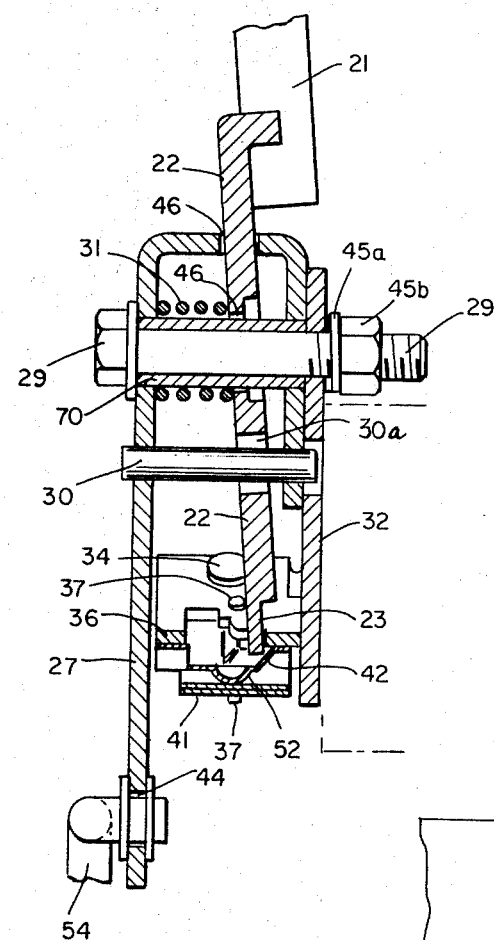

PATENTED DEC 5 1972 3,704,982

INVENTOR.
James F. Hobbins
BY
Paul & Paul
ATTORNEYS.

STICK SHIFTER CONTROL FOR AUTOMATIC TRANSMISSION

BACKGROUND OF THE INVENTION

1. Field of the Invention

This invention relates to transmission controls for automotive vehicles and, more particularly, manually operated automatic transmission controls permitting accurate and fast upshifting and downshifting of the forward speed gears.

2. Description of the Prior Art

Conventional gear shifting apparatus associated with the automatic transmissions of automotive vehicles comprises a shifting stick which is movable in a single slot, or gate, for shifting a transmission to the conventional positions of park, reverse, neutral, first, second, and third. First, second and third are sometimes referred to respectively as low, super, and drive. Such conventional shifting mechanisms are satisfactory for normal automatic transmission use where there is no need for rapid and accurate upshifting and downshifting, and shifting can be accomplished independently of the will of the driver. However, where precisely controlled and very rapid and sustained acceleration is necessary, the driver needs a gearshift mechanism which he can control directly, and which responds positively and affirmatively. See, for example, U. S. Pat. No. 3,292,450 for an example of a prior art gear shifting apparatus adaptable for use with an automatic transmission vehicle.

SUMMARY OF THE INVENTION

It is a primary object of this invention to provide a gear shifting apparatus for control of an automatic transmission vehicle, having a gate cooperating with a cam such that the conventional automatic transmission positions are arranged on one side of such gate, and forward speed positions for competition driving are arranged on the other side, thereby permitting rapid and positive upshifting and downshifting without influence from the automatic transmission positions.

It is a further object of this invention to provide a gear shifting apparatus for automatic transmission vehicles which is simple, reliable, and less expensive than present gear shifting mechanisms.

It is another object of this invention to provide a gear shifting mechanism for automatic transmission vehicles having a construction which permits easy interchanging of critical parts in order to change the shift pattern of the mechanism.

It is another object of this invention to provide a gear shifting mechanism for automatic transmission vehicles having a construction with spring force elements which may readily be added or subtracted to adjust the resistance or feel to the operator for identifying different shifting positions.

Accordingly, the invention provides a stick shifter control for automatic transmission comprising a rotatable stick shift having a bottom tab thereon, which tab extends through a gate opening in a fixed plate, and interacts with the edges of such gate and a spring-loaded cam positioned below said gate. The gate is provided with stops for accurate location of the stick tab, and the cam has a pattern of surfaces, guides and sloped barriers which interact with the said bottom tab. The stick is also spring loaded so as to be normally biased to operation positions where it remains unattended by the driver.

BRIEF DESCRIPTION OF THE DRAWINGS

The full nature of the invention is understood from the following specification and accompanying drawings:

FIG. 1 is a side elevation view of the transmission shift control of this invention linked to a transmission unit of an automotive vehicle.

FIG. 2 is a sectional view taken along the lines 2—2 of FIG. 1.

FIG. 11 is a perspective view of the cam surface as presented to the stick tab.

DESCRIPTION OF THE PREFERRED EMBODIMENT

Figure 3:
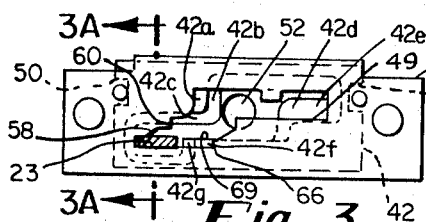
FIG. 3 is a sectional view taken along the lines 3—3 of FIG. 1, showing the relationship of the gate and cam, with the shifter in the first gear position.
Figure 3A:
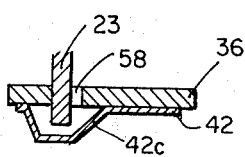
FIG. 3a is a view taken along the lines 3a—3a of FIG. 3.
Figure 9A:
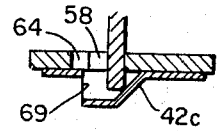
FIGS. 9 and 9a are similar to FIGS. 3 and 3a, with the shifter in second gear, unattended.

Referring now to FIGS. 1 and 2, a stick shown generally at 20 passes through an opening 46 in the top of the U-shaped lever 27, the opening being designed to accommodate and contain the stick while allowing for the shifting movements of such stick as are described below. Lever 27 is attached to housing 32 through bolt 29, which bolt serves as a mounting means, along with washer 45a and nut 45b, for attaching the shifting mechanism to a fixed intermediate member 75 in the vehicle. Holes 33 in housing 32 may also be used for mounting purposes.

Figure 12:
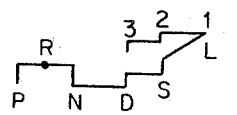
FIG. 12 is a diagram illustrating the shift pattern as seen by the driver.

Shift stick 20 is illustrated as being comprised of upper portion 21 and lower portion 22. Stick 20 may, alternately, be one continuous piece, and it may be either tubular or solid. Stick 20 is rotated by the driver fore and aft about sleeve 70 which contains bolt 29. Such fore and aft movement is generally in a straight line in the direction of the shift pattern. As seen in FIG. 12, proceeding serially from left to right, the stick is shifted from park to reverse to neutral to third to second to first. It is this fore and aft movement which is ultimately transmitted to the transmission to accomplish the desired shifting.

Figure 13A:
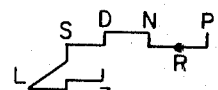
FIG. 13a is a diagram of the shift pattern as followed by the stick tab.
Figure 8:
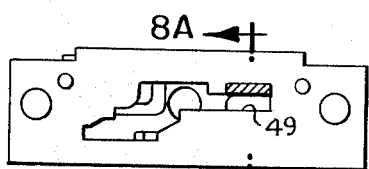
FIGS. 8 and 8a are similar to FIGS. 3 and 3a, with the shifter in park position.
Figure 8A:
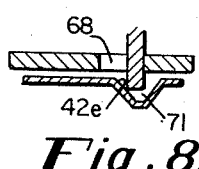
Figure 13B:
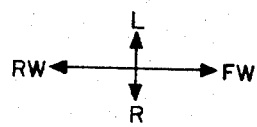
FIG. 13b is a diagram which references the directions of movement of the stick tab.

As is illustrated in FIGS. 12 and 13, and is discussed hereinbelow, the shift pattern encompasses lateral movement as well. Lower portion 22 of stick 20 rotates laterally in a plane containing bolt 29, being constrained by the edges of slot 46 in lever 27. Hole 37 permits lateral excursions of portion 22 axially along sleeve 70, which in turn restrains the up and down movement of stick 20. Bolt 29 and sleeve 70 thus hold the shifter mechanism in assembly, as well as serving functionally as part of the mounting means.

Lever 27 and lower stick portion 22 both pivot on sleeve 70 and are interlocked through slot 46 and pin 30, whereby the rotating motion of stick 20 is transmitted proportionally to the lever. The lower end of lever 27 is attached to a suitable transmission connecting element 54 at hole 44, and the other end of said element 54 is attached to arm 55 which drives the control valve shaft 56 of transmission 76. Thus, the fore and aft motion of the shift stick is converted into angular motion of shaft 56, which accomplishes the intended shifting steps. Conventional automatic transmission units provide detents for all positions in the transmission, and the feel of these detents is sensed by the driver as an aid in locating the desired shift positions. In the shifter of this invention the stops of the gate assist the driver in readily selecting the various shifting positions.

Elongated hole 30a in lower portion 22 of the stick permits the stick to traverse pin 30 at the same time that portion 22 rotates lever 27 about sleeve 70. Pin 30 is fixedly engaged in both legs of lever 27. Spring 31 surrounds sleeve 70 between lower stick portion 22 and lever 27, and provides a force urging lower stick portion 22 in one direction. As is seen below in the discussions of the shift patterns, lateral movement of the stick requires the driver to apply a lateral force to overcome this spring bias.

Quadrant element 36, having a gate opening 49 therein, is secured to arms 32a and 32b of housing 32 by fasteners 34 and 35 respectively. Pins 37 and 38 are fixed in quadrant element 36 and serve to position cam plate 42 within slots 50 and 51, as better seen in FIG. 3. Cam plate 42, positioned below quadrant element 36, has a downward projection 52 which engages leaf springs 41, which springs provide an upward force which normally holds cam plate 42 tightly to the under surface of quadrant element 36. Pins 39 and 40 retain leaf springs 41 against the cam plate. A plurality of leaf springs are employed, and the number of springs may be adjusted to give the desired degree of tightness with which the cam is held against quadrant element 36.

Stick 20 has located at the top thereof a knob 43. FIG. 12 illustrates the shift pattern through which the driver moves knob 43 to shift into the respective positions. The shift pattern as shown in FIG. 12 identifies the basic movements of the top of the stick, or knob, as viewed from above, and as generally seen by the driver. However, the principal functions of the shifter mechanism 48 are best described with reference to the movements of stick bottom tab 23 within opening 49, and with respect to cam 42. Since a forward movement of knob 43 is translated to a backward movement of tab 23, and a lateral movement of knob 43 to the right is translated into a lateral movement of tab 23 to the left, and vice versa, the shift pattern of tab 23, as illustrated in FIG 13, is the inverse of that of the knob as illustrated in FIG. 12. To clarify the description of the various shift positions, as seen in FIGS. 3–11, reference will be made to the pattern of tab movement as illustrated in FIG. 13a. The legend of FIG. 13 b defines the directions of such tab movement. Note that the force of bias spring 31 tends to move the tab to the left.

Referring now to FIG. 3, the tab is shown pulled rearward and moved laterally to the right, such that it is in the first gear position. The rearward movement is attained by the driver pulling the stick shift forward, and the movement to the right is attained by the driver moving the knob laterally to his left, as he views the knob. As seen in FIG. 3, the stick in this position is unattended, meaning that no force need be maintained by the driver in order to maintain the stick in such position, since tab 23 is constrained from moving leftward under the force of spring 31 by edge 57 of gate 49.

Figure 4:
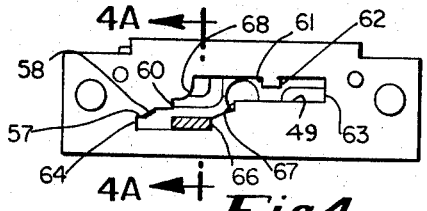
FIGS. 4 and 4a are similar to FIGS. 3 and 3a, with the shifter in second gear position, attended.
Figure 4A:
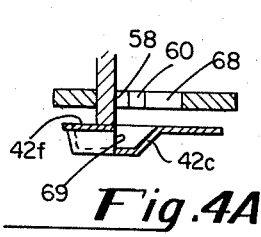
Figure 9:
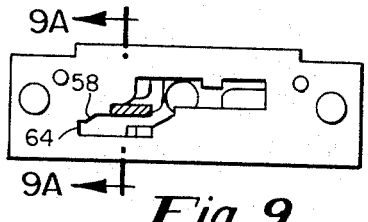

In the descriptions of different shift positions, attended refers to a hands-on condition by the driver, and unattended refers to a hands-off condition. Thus, in moving from the second gear position, unattended, as shown in FIG. 9, to the first gear position shown in FIG. 3, the stick must be moved to the right in order to clear stop 60. Angled surface 58 guides stick tab 23 on to surface 57 and into abutment with stop 64, surface 57 holding the tab against the bias force of the spring. When shifting from first to the second gear position, illustrated in FIG. 4 for the attended condition, the tab 23 is moved directly forward into registry with stop surface 66, where it is held attended against lateral bias spring 31. If, when shifting from first to second, the driver does not hold the stick to the right, or against the spring bias, the stick tab misses stop 66. In moving into the second gear attended position tab 23 rides up incline 42g of cam 42 to surface 42f on the cam, thereby depressing cam plate 42 as is shown in FIG. 4 a. The cam surfaces are also seen in the perspective view of FIG 11. The force required to depress the cam plate may be adjusted by changing the number of leaf springs 41. When the driver ceases to apply lateral force to the stick, bias spring 31 forces the tab directly to the left and into abutment with cam surface 42c and surface 68 of gate 49, where the stick resides in the second gear unattended position as shown in FIG. 9.

Figure 5:
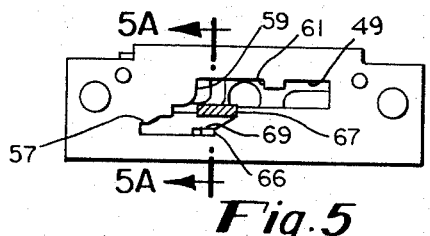
FIGS. 5 and 5a are similar to FIGS. 3 and 3a, with the shifter in third gear.

In order to shift to third gear from the unattended second gear position, the driver moves the tab straight forward into abutment with stop 67, as shown in FIG 5, the tab remaining in this lateral position due to its contact with cam surface 42c, the reaction from surface 42c opposing the lateral bias of spring 31. Thus, the driver can leave the stick unattended in this position, the tab staying within the confines of gate opening 49 and to the right of cam surface 42c. It is now seen that the driver can conveniently upshift from first to second to third, and downshift from third to second to first, without any interference from the other positions which are generally used in automatic transmission operation.

Figure 5A:
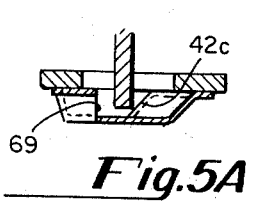

When the stick is in the second gear attended position, with the driver keeping the tab to the right, the driver shifts into third by allowing the stick tab to move to the left under the influence of bias spring 31. As the bottom of stick tab 23 clears the cam surface 42f, the entire cam plate 42 is permitted to move to its uppermost and normal position under quadrant plate 36 presenting edge 69, as seen in FIG. 5a, to the tab to effectively block off stop 66.

The presence of edge 69 assures that tab 23 cannot make contact with stop 66 during the forward movement to the third stop 67.

Figure 10:
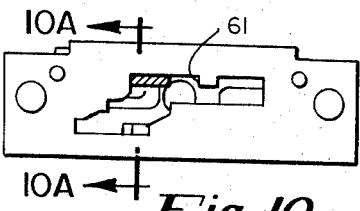
FIGS. 10 and 10a are similar to FIGS. 3 and 3a, with the shifter in third gear, unattended.
Figure 6:
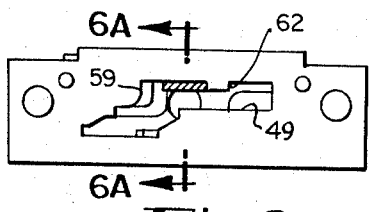
FIGS. 6 and 6a are similar to FIGS. 3 and 3a, with the shifter in neutral position.
Figure 6A:
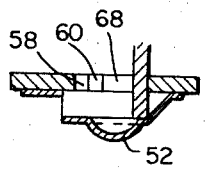
Figure 10A:
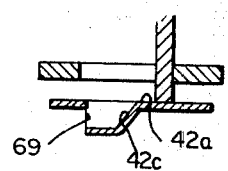
Figure 7:
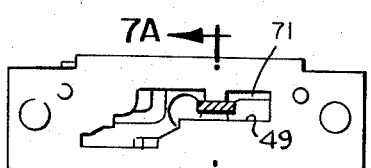
FIG. 7 and 7a are similar to FIGS. 3 and 3a, with the shifter in reverse position.
Figure 7A:
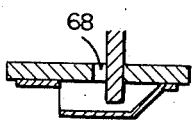

The tab 23 is moved directly from the third gear position shown in FIG. 5 to the unattended third gear position as shown in FIG. 10 by being forced leftward against ramp 42c, displacing cam plate 42 downward. Such lateral movement alone does not affect operation of the automatic transmission unit, since it imparts no movement to lever 27. Stick tab 23 is movable back and forth from the third gear position to neutral between the limiting stops 59 and 61 of gate 49. In both such positions the stick, unattended, naturally resides against the left hand edge of the gate due to the bias of spring 31. In order to shift from either third or neutral to the reverse position, the driver urges the tab laterally to the right and pushes it forward such that it resides in the reverse position as shown in FIG. 7. In such position, tab 23 abuts cam surface 42d, such abutment being coincidental with movement to the reverse detent position in the automatic transmission unit. Cam surface 42d adds an additional feel of resistance, thereby aiding the driver to more readily locate the reverse position. This feature allows the driver to efficiently rock the vehicle by moving the stick tab back and forth between stop 59 for the third gear position, and cam surface 42d for the reverse position.

In order to place the transmission in the park position, the driver moves the stick tab straight forward from reverse until it clears surface 62, at which time it is forced by spring 41 down cam surface 42e into pocket 71, where it is effectively locked in the park position. To release the shifting mechanism from the park position, the driver must exert a lateral force to the right sufficient to overcome both the spring bias and the opposition of cam surface 42e, before movement is permitted rearward to the other positions.

From the above description, it is seen that gate 49 in cooperation with movable cam 42 provide a pattern of stops and surfaces which enable the driver to positively identify, through the forces on the stick, the positions into which and through which he is shifting. As stated before, the movement of lever 27, which is caused by the fore and aft movements of stick 20, is transmitted through arm 55 to control shaft 56. The incremental positions of control 56, corresponding to the respective shift positions of the transmission, correspond to detents internally of the transmission, which detented transmission positions are coincidental with the positions of stick bottom tab 23 as located by the stop surfaces in gate 49. In addition, the spring forces provided by spring 31 and leaf springs 41 provide resistance forces which guide the driver through the shift pattern. It is noted that the driver may upshift and downshift through the normal positions, by allowing the force of bias spring 31 to keep the stick to the left. The round corner on edge 68 provides smooth downshifting from third to second, as defined by stops 59 and 60 respectively. Whenever rapid shifting through only the three forward gears is desired, the driver moves the stick laterally to the right, such that he is then free to upshift and downshift. Cam surface 42c in combination with the force exerted by leaf springs 41 prevents a return to the automatic transmission positions unless or until the driver exerts sufficient lateral force to the left to move the tab 23 into surface 42c driving cam plate 42 downward.

I claim:

1. A gearshift apparatus for control of an automatic transmission of a vehicle, comprising: a housing for connection to the vehicle; a shift stick movably mounted to said housing for to and fro movement of said stick; said shift stick having an upper and lower end and including a tab at its lower end; an output lever connected with said stick and said housing and being movable relative to said housing responsive to and fro movement of said stick; a guide plate connected to said housing and having a gate therein through which the tab end of said stick extends, said gate being defined by edges establishing guide surfaces for said tab end; a cam plate connected to said housing adjacent to said guide plate and having cam surfaces thereon located for abutment by said tab end responsive to the movement of said stick and the guiding of said tab by said guide surfaces; means associated with said cam plate for urging the same into engagement with the tab end of said stick; the movement of said output lever is being limited by the positioning of said tab with respect to said guide surfaces and the positioning of said tab end with respect to said cam plate.

2. The apparatus as described in claim 1 comprising a spring which exerts a force against said shift stick so as to normally bias said tab against a first side of said gate and having a plurality of leaf springs which normally hold said cam plate against said guide plate.

3. The apparatus as described in claim 2 wherein said cam plate is deflectable and includes a barrier which acts to divide said gate into two operating sides, a first side toward which said tab is normally biased by said spring means and containing a plurality of positions for automatic transmission driving, and said opposite side containing forward speed positions for rapid shifting.

4. The apparatus as described in claim 3 wherein said gate contains stop edges defining a plurality of shift positions.

5. The apparatus as described in claim 3 wherein said cam surface has portions thereof at two different levels relative to said gate, such that when said tab is in contact with said cam surface at a first level, said cam plate is held firmly against said quadrant member by said leaf springs, and when said tab is in contact with said cam surface at a second level, said cam plate is displaced from said guide plate.

6. A gearshift apparatus for control of an automatic transmission of a vehicle, comprising: a housing for connection to the vehicle; a shift stick movably mounted to said housing for to and fro movement in transversally oriented paths of travel, said shift stick having an upper and lower end and including a tab at its lower end; an output lever connected with said stick and said housing and being linearly movable relative to said housing responsive to the movement of said stick; pattern means for guiding and constraining the movement of said tab, said pattern means including a gate having edges defining a guide and a cam member adjacent said gate having cam surfaces for tracking by said tab end, the movement of said output lever being limited by the positioning of said tab with respect to said guide and the positioning of said tab end with respect to said cam plate.

7. The apparatus as described in claim 6 wherein one of said cam surfaces has a first portion at a first level and a second portion at a second level, said two portions defining an edge which protects against shifting into Second Gear attended while shifting from Second Gear Unattended to Third Gear.

* * * * *